United States Patent

Krauss et al.

Patent Number: 5,910,068
Date of Patent: Jun. 8, 1999

[54] COUNTERSHAFT AUTOMATIC GEARBOX, IN PARTICULAR AN AUTOMATIC GEARBOX FOR MOTOR VEHICLES

[75] Inventors: Christian Krauss, Cologne; Rolf Najork, Odenthal; Thomas Wollny; Thomas Flintrop, both of Cologne, all of Germany

[73] Assignee: Ford Global Technologies, Inc., Dearborn, Mich.

[21] Appl. No.: 08/930,123

[22] PCT Filed: Jul. 11, 1996

[86] PCT No.: PCT/EP96/03048

§ 371 Date: Jan. 12, 1998

§ 102(e) Date: Jan. 12, 1998

[87] PCT Pub. No.: WO97/04254

PCT Pub. Date: Feb. 6, 1997

[30] Foreign Application Priority Data

Jul. 19, 1995 [DE] Germany ............................ 195 26 273

[51] Int. Cl.[6] .................................................. F16H 61/40
[52] U.S. Cl. .............................. 477/109; 477/124; 74/335
[58] Field of Search .................................. 74/335, 336 R, 74/339; 477/109, 78, 90, 107, 123, 124; 701/54, 64, 55, 56

[56] References Cited

U.S. PATENT DOCUMENTS

| | | | |
|---|---|---|---|
| 5,113,721 | 5/1992 | Polly | 701/54 X |
| 5,505,100 | 4/1996 | Mitchell et al. | 74/335 |
| 5,580,331 | 12/1996 | Shiraishi et al. | 477/109 |
| 5,582,558 | 12/1996 | Palmeri et al. | 477/111 X |
| 5,608,626 | 3/1997 | Ibamoto et al. | 477/78 X |
| 5,669,851 | 9/1997 | Tietze | 477/109 |
| 5,672,139 | 9/1997 | Horiguchi | 477/120 |
| 5,711,712 | 1/1998 | Graf | 477/78 X |
| 5,778,329 | 7/1998 | Officer et al. | 701/55 |

*Primary Examiner*—Dirk Wright
*Assistant Examiner*—Peter T. Kwon
*Attorney, Agent, or Firm*—James J. Dottavio

[57] ABSTRACT

In an automatically shiftable countershaft transmission, particularly for motor vehicles, the shift travels between the engagement points are established and the shift force may be varied as a function of gear step and dynamic load over the engagement travel. Depending on the functional phase, a lower force is provided during the synchronization phase, a higher force is provided during the shift-through phase and a lower force is provided during the dog-in phase.

20 Claims, 6 Drawing Sheets

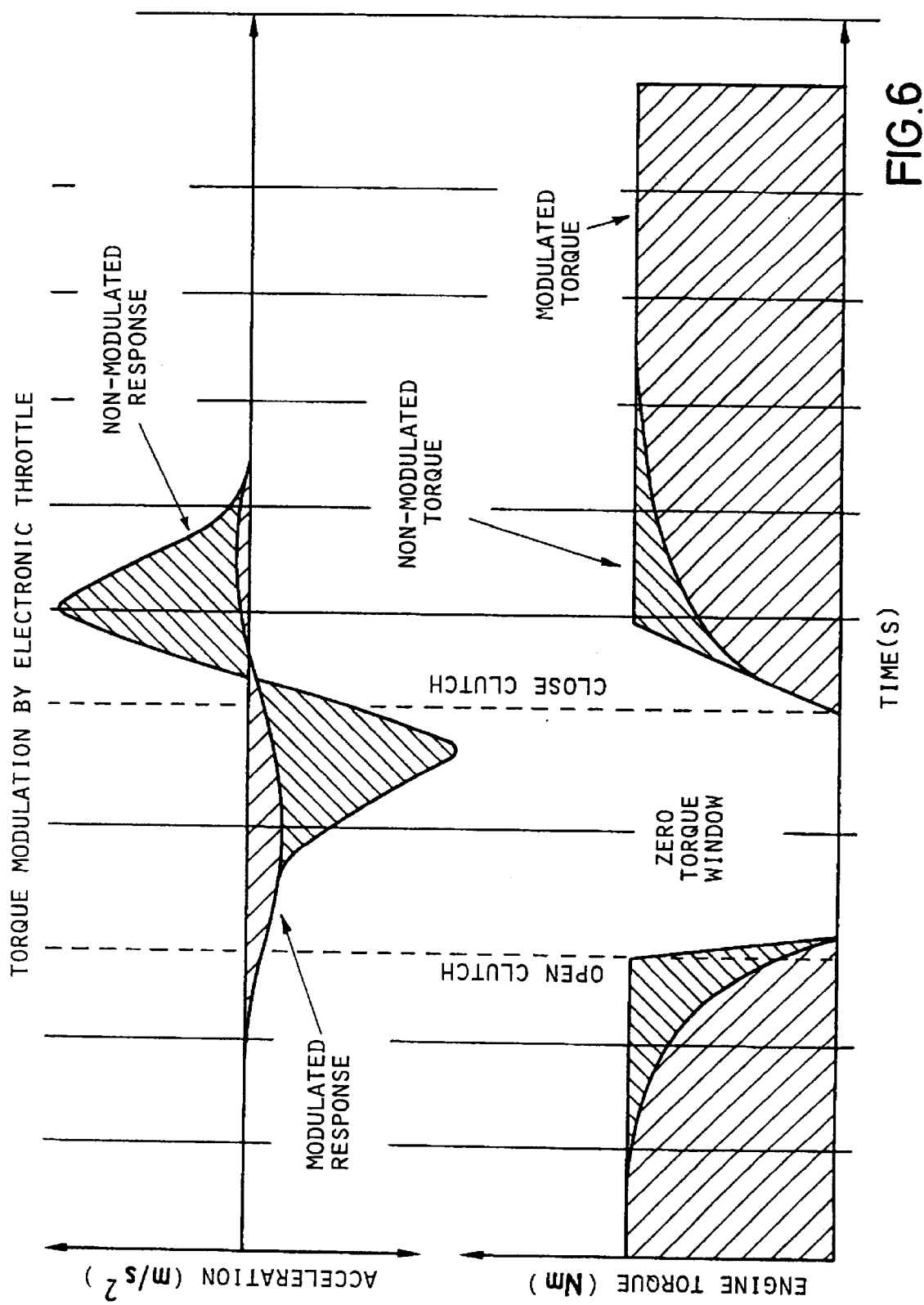

//COUNTERSHAFT AUTOMATIC GEARBOX, IN PARTICULAR AN AUTOMATIC GEARBOX FOR MOTOR VEHICLES

BACKGROUND OF THE INVENTION

1. Field of the Invention

The present invention relates to an automatically shiftable countershaft transmission for motor vehicles. More specifically, the invention relates to varying the shift force as a function of the gear step and the dynamic load (Ldyn) over the engagement travel (WE) in such a way that, depending on the functional phase, a lower force is provided during the synchronization phase, a higher force is provided during the shift-through phase, and a lower force is provided during the dog-in phase.

2. Description of the Related Art

British patent specification 1 281 106 discloses an automatically shiftable countershaft transmission, particularly for motor vehicles. The transmission casing houses a plurality of gearwheel pairs which are constantly in mesh with one another and can be selectively connected to their respective shafts by means of dog clutches. The dog clutches are actuated by means of electronically controlled hydraulic servo devices in order to effect automatic gear shifts as a function of the operating parameters of the driving engine and of the motor vehicle. All necessary components such as hydraulic pumps, actuating cylinders and the like are included in a constructional unit which can be attached to the transmission casing.

This transmission has the inherent disadvantage of only using dog clutches to shift into the individual gear steps. An accelerating and retarding unit must be provided on the countershaft and must be further controlled in dependence on speed sensors. The dog clutch elements which are to be brought into engagement with one another must therefor be synchronized before the engagement of the gear steps can take place.

In the periodical "Automobil-Revue" No. 16 of Apr. 15, 1993, "Auf den Spuren von Senna, Prost & Co. (In the footsteps of Senna, Prost & Co.)" there is a report of an automatically shiftable countershaft transmission, particularly for motor vehicles. A plurality of gearwheel pairs which are constantly in mesh with one another are disposed in a transmission casing and can be brought into engagement with one another through synchronizing devices. The actuation of these synchronizing devices takes place through an electronic control module by means of a cam control unit. No detail is provided as to the arrangement of the servo device.

In the periodical "Automobil-Revue" No. 12 of 17.03.1994 "Schalten wie in Formel 1 (Change gear as it's done in Formula 1)" there is a report about automatically shiftable countershaft transmissions in which it is stated in general terms that an electronic control module actuates the pneumatic servo device so that gear shifting is undertaken with deliberate care for the synchronizing devices. No detail is provided as to the manner in which this sensitive actuation is effected.

It is desirable to provide an automatically shiftable countershaft transmission, particularly for motor vehicles, which is based on a mass production manual transmission which can be converted to an automatically shiftable countershaft transmission which does not place undue demand on the synchronizing devices within the transmission.

SUMMARY OF THE INVENTION

The present invention provides an automatically shiftable countershaft transmission for motor vehicles which does not place undue demand on the synchronizing devices within the transmission. The transmission housing contains a gear system having a plurality of gearwheel pairs which are constantly in mesh with one another and synchronizing devices which are actuated by shifting devices. The shifting devices are actuated by servos which are selectively controlled by an electronic control module and modulation of the driving engine during the execution of gear shifts is provided by electronic power control means. Further, all the components, such as hydraulic pumps, reservoirs, and the hydraulic actuating cylinders required for the servo devices are included in a constructional unit which is attached to the transmission casing.

The shift Engagement travel for each shifting movement is detected by two sensors, one for the travel in the X-direction and one for the travel in the Y-direction. The engagement distance between the points is thus established and standardized as 100%. The shift force is preferably stored in a 3-dimensional characteristic map as a function of the shift travel and of the speed differential or the dynamic load factor.

The shift force is varied as a function of the gear step and the actual difference in engine speed over the engagement travel in such a way that, depending on the functional phase, a lower force is provided during the synchronizing phase, a higher force is provided during the shift-through phase and a lower force is provided during the dog-in phase. A greater force is exerted during a downshift and a lesser force during an upshift. Further, in the case of a large difference in engine speed and high engine torque, a higher shift force is supplied in order to perform the corresponding gearshift in an optimum manner.

These and other desired objects of the present invention will become more apparent in the course of the following detailed description and appended claims. The invention may best be understood with reference to the accompanying drawings wherein illustrative embodiments are shown.

BRIEF DESCRIPTION OF THE DRAWINGS

FIG. 6 is a diagram of the modulation of the engine acceleration against the engine torque.

DETAILED DESCRIPTION OF THE PREFERRED EMBODIMENTS

Figure 1:
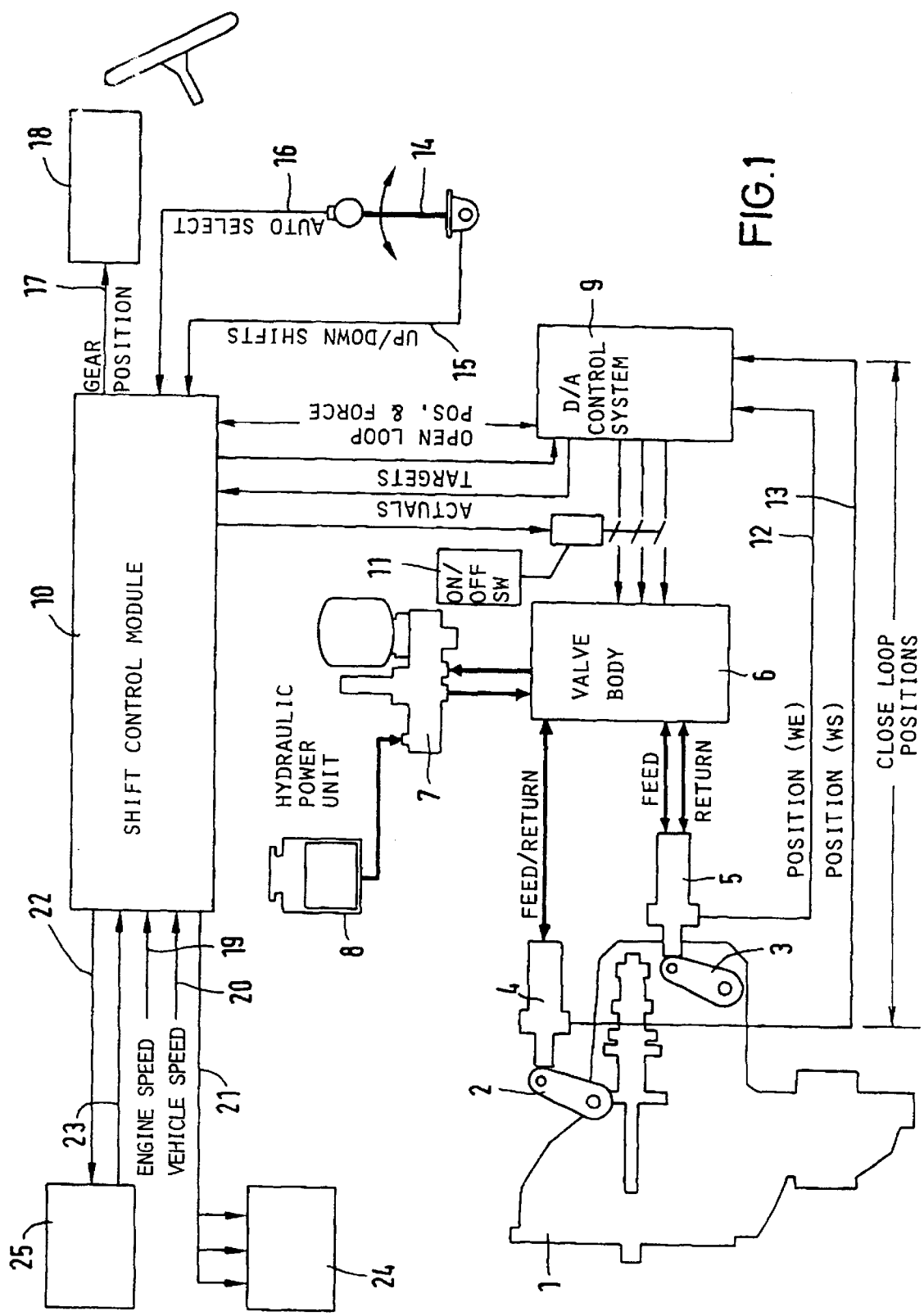
FIG. 1 is a diagram of the functional layout of an automatically shiftable countershaft transmission, in particular for motor vehicles, in which, for easier understanding, control and servo units for the transmission to be shifted are shown as single systems.

In FIG. 1 a countershaft transmission 1 is indicated in which two shifting devices 2 and 3 are provided. The first Shift device 2, serves to preselect the shift lane and the second shift device 3 serves to execute the shift.

The two shift devices 2 and 3 are actuated by means of respective servo devices 4 and 5. The servo devices 4 and 5 are controlled by a valve control device 6 through corresponding lines. The valve control unit 6 is supplied with hydraulic fluid by means of a hydraulic power unit 7, which is connected to a hydraulic fluid container 8. The electronic control of the hydraulic valves in the valve control unit 6 takes place through a computer 9 and a control module 10.

The computer 9 is connected to the valve control module by a safety relay 11. The computer 9 is supplied via leads 12 and 13 with the positions of the respective servo devices 4 and 5. The position of the servo devices 4 and 5 are standardized to 100% within the shift travel. The lead 13 reports the amount of preselection travel (WS=path selector) and the lead 12 reports the amount of engagement travel (WE=engagement).

The control module 10 receives signals from a shift lever 14. Driver-controlled gear selection is possible through a lead 15 while fully automatic operation of the transmission is possible through a lead 16. Accordingly, the desired mode of operation is selected by the driver by actuation of a selector knob or lever. The engaged gear step is presented to the driver on a display 18, as supplied by a lead 17.

The control module 10 is supplied with operating data through sensors normally present in a motor vehicle. Engine speed and vehicle speed inputs are provided through leads 19 and 20. The control module 10 can modulate the operation of the internal combustion engine through lead 21 and operation of the automated clutch is provided through leads 22 and 23. A clutch computer 25 is provided to control the clutch and a throttle valve computer 24 is provided to control the throttle valve.

Determination of the points of engagement

At the start of each shifting movement the travel between the current starting position and the target position is scaled to 100%. Start position is at 0% and corresponds to the neutral position in the lane. Target position is at 100% and corresponds to the gear being engaged in the fully dogged-in position (end position). Measurements have shown that when engaging a gear the synchronization takes place between 15% and 30% and the locking of the clutch dogs between 80% and 85% of the shift travel.

Determination of the dynamic load factor

Before the start of a shifting process the torque produced by the IC engine is determined from the position of the throttle valve and the engine speed. With information about the current gear and that to be shifted into, the difference in engine speed expected between the two gears is determined. This speed differential must be reduced to zero by the synchronisation before the gear can be engaged noiselessly and without wear. If a shift is always to take the same time, an increased speed differential requires an increased force to be exerted (linear relationship). From the precalculated speed differential a Factor 1 is determined with the aid of a table.

TABLE 1

Determination of the Factor 1 from the speed differential.

| Speed differential rpm] | 0 | 500 | 1000 | 2000 |
|---|---|---|---|---|
| Factor 1 [-] | 0 | 0.6 | 1 | 2 |

From the current torque of the IC engine a Factor 2 is determined which detects the driving situation as desired by the driver. For example, the position of the accelerator pedal or the rate of change of the position of the accelerator pedal could also be used in order to detect the driver's wishes.

TABLE 2

Determination of Factor 2 from the torque of the engine before the shift (example).

| Pre-shift torque [Nm] | 0 | 80 | 120 | 160 |
|---|---|---|---|---|
| Factor 2 [-] | 1 | 1.3 | 1.6 | 2 |

The two factors are now multiplied together and give a pointer to the layer of the shift force characteristic map or to a load factor (%) as a function of the driving situation:

Layer (or load factor in %, see FIG. 2)=Factor 1*Factor 2

Determination of the shift force as a function of shift travel and load factor

Figure 2:
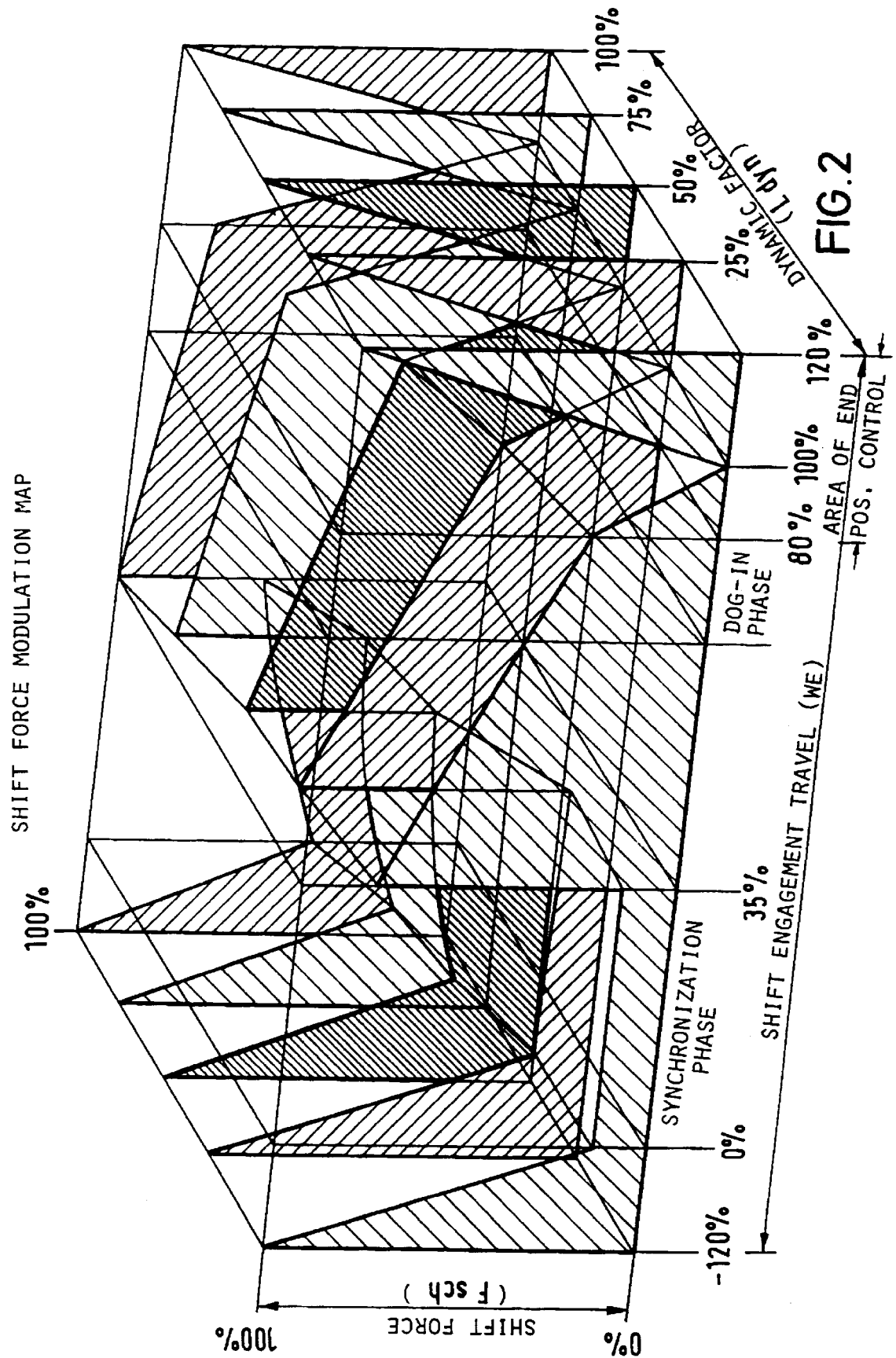
FIG. 2 shows the 3-dimensional characteristic map showing shift force against the shift engagement travel and a dynamic load factor.

In the shift force characteristic map, FIG. 2, a 3-dimensional characteristic map of shift force against the shift travel and the dynamic load factor is shown and the two input variables: shift engagement travel, and load factor, provide the current force value.

TABLE 3

Determination of the current shift force (Fsch) from load factor and shift travel.

| Layer/ Load Factor | Shift Travel [%] | | | | | |
|---|---|---|---|---|---|---|
| [%] | 0 | 15 | 30 | 32 | 75 | 100 |
| 0/0 | 200[N] | 200[N] | 250[N] | 500[N] | 500[N] | 0[N] |
| 1/25 | 200[N] | 300[N] | 350[N] | 500[N] | 500[N] | 0[N] |
| 2/50 | 200[N] | 350[N] | 400[N] | 500[N] | 500[N] | 0[N] |

In the synchronization region the shift force is specified, as shown in the example of the tables, as a function of the driving situation. After the conclusion of the synchronization phase, the force is greatly increased in order to effect rapid shift-through. On reaching the target position of 100% of the shift travel, when the gear is completely engaged, the force is decreased to zero and the end position control of the force is activated. This ensures that force is only applied to the shifting system if the position of the shift mechanism deviates greatly from the prescribed position.

EXAMPLE

TABLE 4

Force control in the end position: if the mechanism goes past the specified target point, the travel becomes > 100%).

| Shift travel (WE)[%] | 80 | 95 | 100 | 105 | 110 | 120 |
|---|---|---|---|---|---|---|
| Shift force (Fsch)[N] | 500 | 200 | 0 | 200 | 500 | 500 |

If the shift mechanism remains in the correct end position, no force is exerted and the shift forks are not worn. In the event of greater deviations the force is increased so as to actively return the shift mechanism to the correct end position (see example in the table).

Since each gear can be actuated in the direction of an upshift or in the direction of a downshift, for each gear two tables are set up (analogous to Table 3). In the upshift table lower forces are prescribed for the upshift and lower forces for the synchronization than in the downshift table. The engagement of a gear can be divided into phases:

- start-up of synchronization
- synchronization
- shift-through and production of a form-locking connection
- attainment of the end position.

The force is adjusted as a function of these phases. Thus in the synchronization phase, in which the synchronization has to compensate by friction for the speed differential between the shaft and the gearwheel to be shifted, too high a shift force leads to increased wear or damage to the synchronization unit. During shift-through, on the other hand, no damage can be caused by too high a shift force, and to obtain a short shift time the shift force is therefore also increased to the maximum.

Modulating the operation of the IC engine

Figure 3:
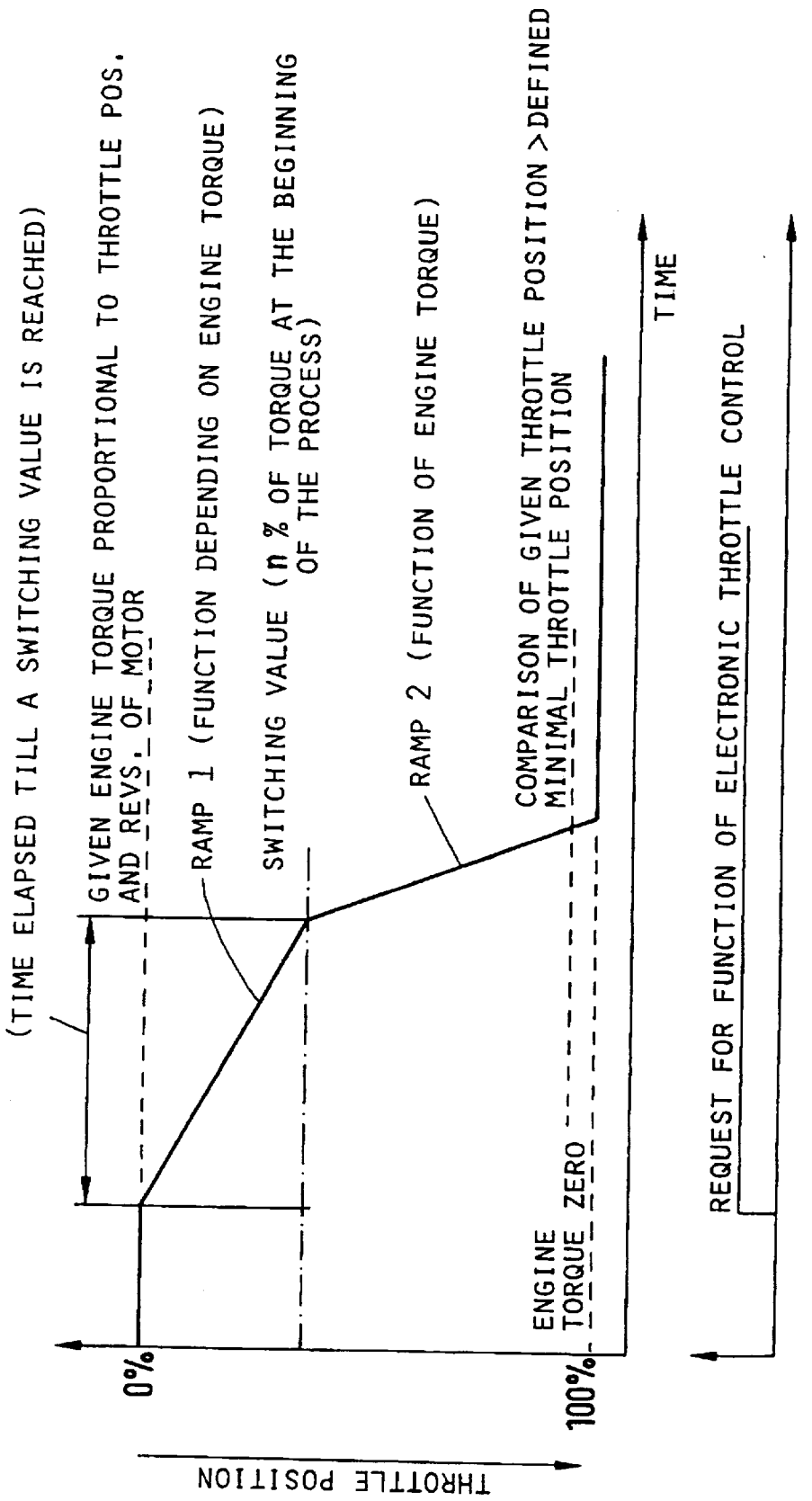
FIG. 3 is a diagram of the torque control before a shift.

In order to obtain the quietest possible shift, the torque of the engine must not be suddenly reduced, because of the large changes in acceleration that result. Any modulation of the operation of the engine must be carefully controlled. In the present example this function is represented by intervention at the throttle valve as in FIG. 3. The electronic throttle valve is controlled to close before the shifting process, remains closed during the shifting process to prevent racing of the engine and is controlled to open again after the shifting process. The process of opening and closing is controlled as a function of the engine load before the shift. Through the controlled closing and opening of the throttle valve a desired reduction and increase of the torque is produced around the shifting process, which effects the smoothness of the shifting process.

As a result of the highly non-linear torque characteristic map of IC engines it is sensible not to control the throttle valve position; instead, it is better to reduce the torque. Thereby, in dependence on the respective load situation (load=f(engine speed, throttle valve position), a uniform reduction in the torque can be achieved.

If the engine speed to be set by the throttle valve is less than 700 rpm, the electronic throttle valve is regulated according to Ramp 1 and Ramp 2. If this value is exceeded, regulation is performed to an intended engine speed which is determined in dependence on the next gear to be shifted into.

On closing the throttle valve the gradients of the ramps should be capable of calibration as a function of the initial torque when the shifting process is initiated. In this way a smooth, slow closing is possible when the throttle valve is slightly open and rapid closing when it is wide open. A targeted modulation of the shift comfort is achieved by the calibration of the throttle valve actuation.

Figure 4:
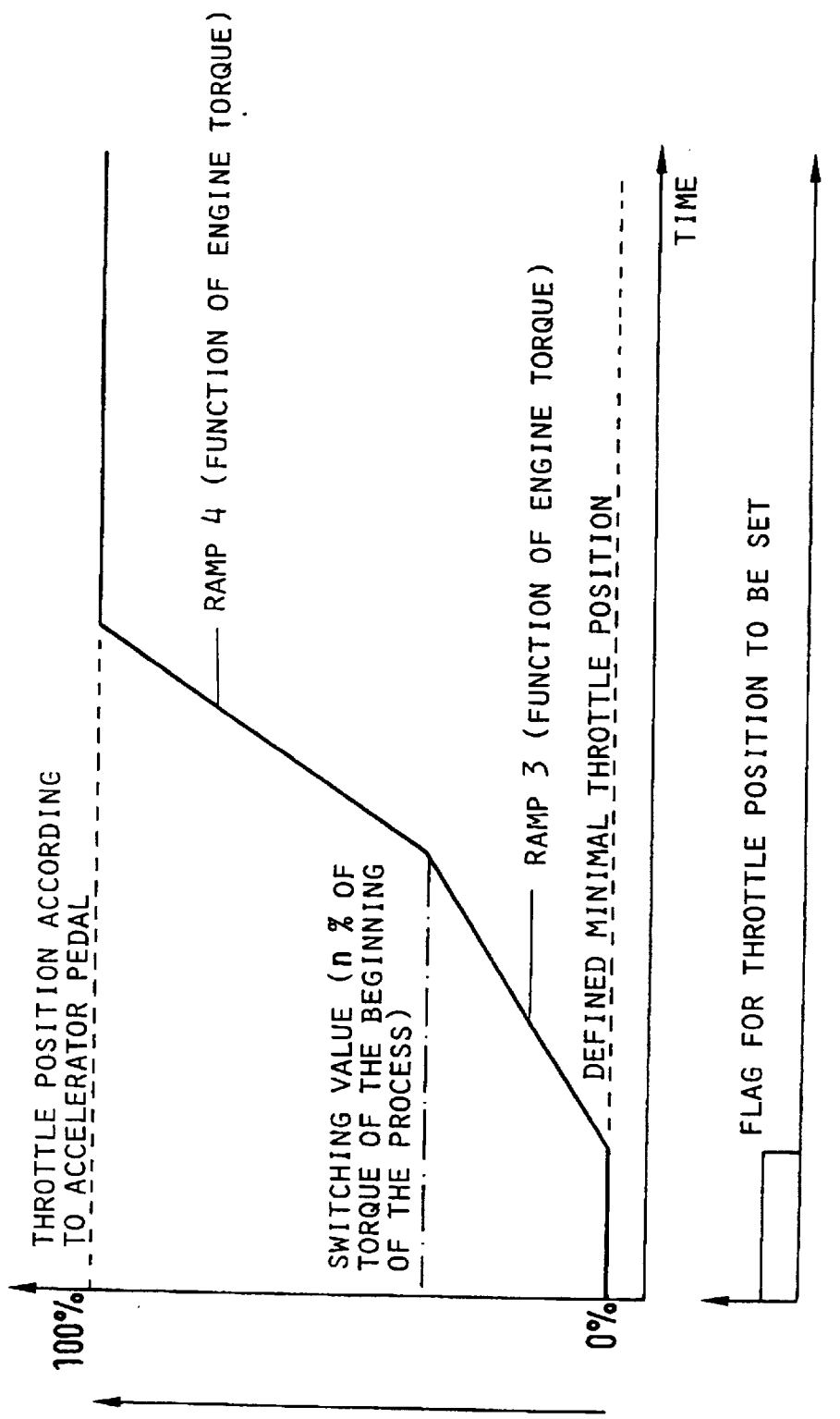
FIG. 4 is a diagram of the torque control after a shift.

On opening the throttle valve after the conclusion of the shift the gradients of the throttle valve angle ramps should be capable of calibration as a function of the target torque value, FIG. 4, (function of the current pedal position).

Figure 5:
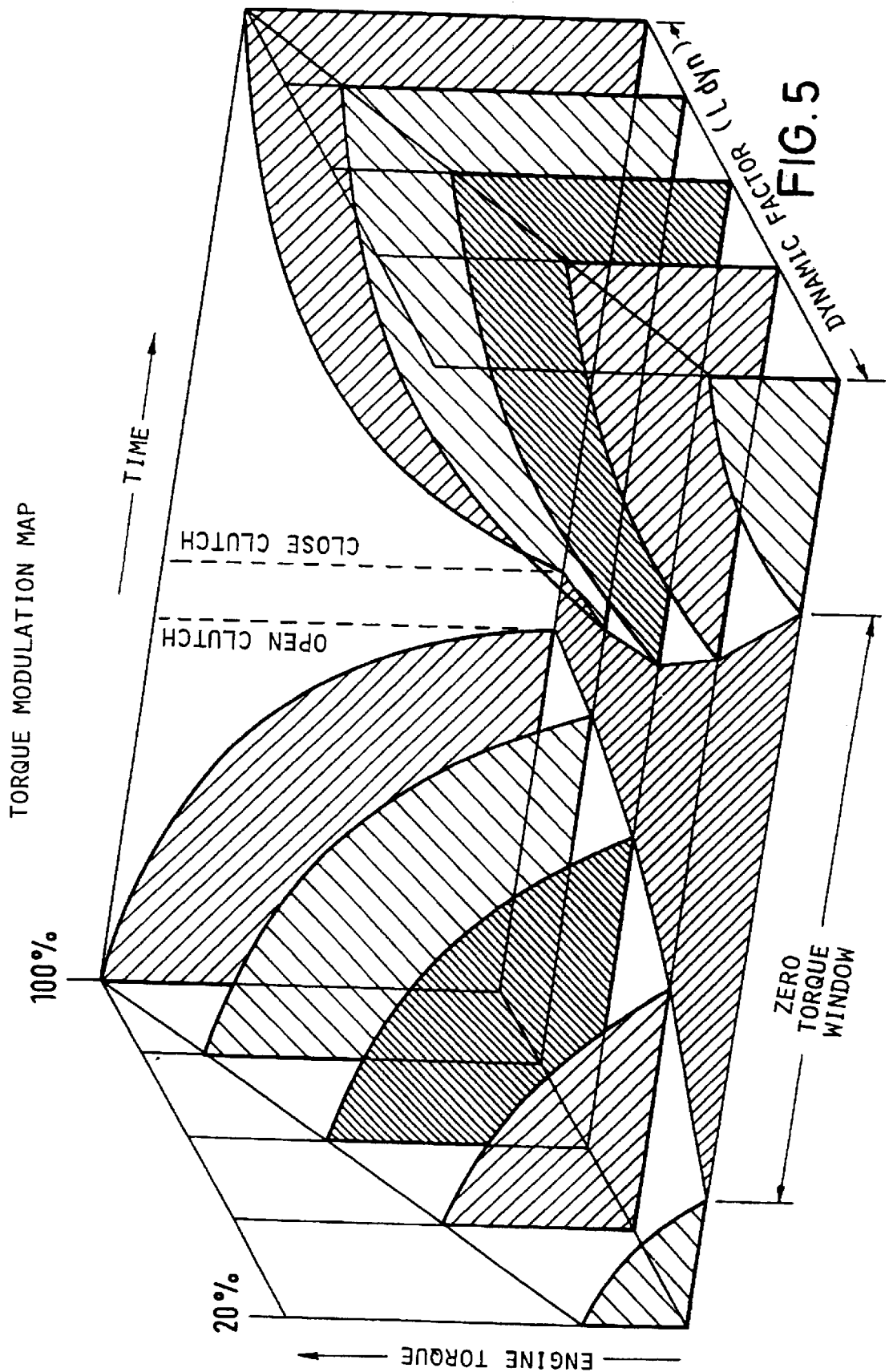
FIG. 5 shows a 3-dimensional characteristic map of the torque modulation.

As can be seen from FIG. 5, the clutch control likewise seeks to provide a "zero torque window" during the executed shift. The time interval in which the clutch is open is controlled as a function of the dynamic load factor wherein the time interval is proportional to the load.

As can be seen from FIG. 6, the modulation of the IC engine by the electronic throttle valve provides a smooth transition in the reduction and increase of torque.

It is thus seen that the objects of this invention have been fully and effectively accomplished. It will be realized, however, that the foregoing preferred embodiments have been shown and described for the purpose of illustrating the functional and structural principles of this invention and are subject to change and modification by those skilled in the art without departing from the principles described. Therefore, this invention includes all modifications encompassed within the spirit and scope of the following claims:

We claim:

1. An automatically shiftable countershaft transmission for a vehicle, comprising:
    a transmission housing;
    a gear system within said housing having a plurality of gear ratios for transmitting a dynamic load and a gear step comprising a shift from a first one of said ratios to a second one of said ratios;
    synchronizing means for synchronizing said gear system;
    shifting means for actuating said synchronizing means over a shift travel through a plurality of shift phases when shifting said gear system to one of said gear ratios;
    a servo for applying a shift force for actuating said shifting means;
    a sensor for detecting a position of said servo means and generating a servo position signal in response thereto; and
    a computer for receiving said servo position signal from said sensor and varying said shift force as a function of gear step and dynamic load when shifting said gear system through said gear step.

2. The automatically shiftable countershaft transmission of claim 1, wherein said servo applies a first shift force during the synchronization phase of said shift travel and said servo applies a second shift force during a shift-through phase of said shift travel, said first shift force being of a lower magnitude than said second shift force.

3. The automatically shiftable countershaft transmission of claim 2, wherein said servo applies a third shift force during a dog-in phase of said shift travel, said third shift force being of a lower magnitude than said second shift force.

4. The automatically shiftable countershaft transmission of claim 3, wherein said servo applies an upshift force for upshifting and a downshift force for downshifting, wherein said downshift force is greater than said upshift force.

5. The automatically shiftable countershaft transmission of claim 1, wherein said servo applies an upshift force for upshifting and a downshift force for downshifting, wherein said downshift force is greater than said upshift force.

6. The automatically shiftable countershaft transmission of claim 1, wherein said servo applies a first shift force during the synchronization phase of said shift travel, said servo applies a second shift force during a shift-through phase of said shift travel and said servo applies a third shift force during a dog-in phase of said shift travel, wherein said first shift force, said second shift force, and said third shift force are of equivalent magnitude.

7. The automatically shiftable countershaft transmission of claim 1, wherein said shift force is proportional to said dynamic load.

8. The automatically shiftable countershaft transmission of claim 1, wherein said computer varies said shift force as a function of shift phase and dynamic load factor.

9. The automatically shiftable countershaft transmission of claim 1, wherein said vehicle includes an electronically controlled throttle and a throttle computer for controlling said throttle, wherein said throttle computer modulates said throttle as a function of dynamic load and lowers said dynamic load prior to execution of said one of said shift phases.

10. The automatically shiftable countershaft transmission of claim 9, wherein said throttle computer modulates said throttle as a function of dynamic load and increases said dynamic load after execution of said one of said shift phases.

11. The automatically shiftable countershaft transmission of claim 10, wherein said throttle computer modulates said throttle as a function of torque and time.

12. The automatically shiftable countershaft transmission of claim 1, wherein said computer provides a zero torque window as a function of the dynamic load factor during one of said shift phases.

13. The automatically shiftable countershaft transmission of claim 12, wherein said computer provides a larger zero torque window when said dynamic load factor is low and a smaller zero torque window when said dynamic load factor is high.

14. The automatically shiftable countershaft transmission of claim 13, wherein said servo applies an upshift force for upshifting and a downshift force for downshifting, wherein said downshift force is greater than said upshift force and wherein said servo applies a first shift force during a synchronization phase of said shift travel, said servo applies a second shift force during a shift-through phase of said shift travel and said servo applies a third shift force during a dog-in phase of said shift travel, said first shift force, and said third shift force being of a lower magnitude than said second shift force.

15. An automatically shiftable countershaft transmission for a vehicle, comprising:

a transmission housing;

a gear system within said housing having a plurality of gear ratios for transmitting a dynamic load and a gear step comprising a shift from a first one of said ratios to a second one of said ratios;

synchronizing means for synchronizing said gear system;

shifting means for actuating said synchronizing means over a shift travel through a plurality of shift phases when shifting said gear system to one of said gear ratios;

a servo for applying a shift force for actuating said shifting means;

a sensor for detecting a position of said servo and generating a servo position signal in response thereto;

a computer for receiving said servo position signal from said sensor and varying said shift force as a function of gear step and dynamic load when shifting said gear system through said gear step;

an electronically controlled throttle and a throttle computer for controlling said throttle, said throttle computer modulating said throttle as a function of dynamic load, said throttle control computer lowering the dynamic load prior to entering one of said shift phases and increasing said dynamic load after said one of said shift phases is exited; and an automatic clutch control means for providing a zero torque window as a function of dynamic load factor during execution of said one of said shift phases, said clutch control means providing a larger zero torque window when said dynamic load factor is low and a smaller zero torque window when said dynamic load factor is high.

16. The automatically shiftable countershaft transmission of claim 15, wherein said computer varies said shift force as a function of shift phase and dynamic load factor.

17. The automatically shiftable countershaft transmission of claim 16, wherein said computer modulates torque using a three-dimensional characteristic map in which the torque is stored as a function of time.

18. The automatically shiftable countershaft transmission of claim 17, having a selector means for manual gear selection.

19. The automatically shiftable countershaft transmission of claim 15, further comprising:

a fully automatic shift mode;

a semi automatic shift mode; and a mode selector for selecting one of said shift modes.

20. The automatically shiftable countershaft transmission of claim 19, wherein said servo applies an upshift force for upshifting and a downshift force for downshifting, wherein said downshift force is greater than said upshift force, and wherein said, servo applies a first shift force during a synchronization phase of said shift travel, said servo applies a second shift force during a shift-through phase of said shift travel and said servo applies a third shift force during a dog-in phase of said shift travel, said first shift force and said third shift force being of a lower magnitude than said second shift force.

\* \* \* \* \*